US007835860B2

(12) United States Patent
Yamada

(10) Patent No.: US 7,835,860 B2
(45) Date of Patent: Nov. 16, 2010

(54) CONTROL INFORMATION OUTPUT DEVICE

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 187 days.

(21) Appl. No.: 11/882,143

(22) Filed: Jul. 31, 2007

(65) Prior Publication Data

US 2008/0071472 A1 Mar. 20, 2008

(30) Foreign Application Priority Data

Sep. 15, 2006 (JP) ............................. 2006-251348

(51) Int. Cl.
*G01C 21/30* (2006.01)
*G01C 21/00* (2006.01)
*G10K 1/08* (2006.01)
*H01R 13/66* (2006.01)

(52) U.S. Cl. .................. 701/209; 701/201; 340/995.23; 439/620

(58) Field of Classification Search .................. 701/23, 701/25, 200–226; 340/988–996
See application file for complete search history.

(56) References Cited

U.S. PATENT DOCUMENTS

| 5,787,233 | A * | 7/1998 | Akimoto ...................... 706/45 |
| 5,842,147 | A * | 11/1998 | Nimura et al. ............... 701/211 |
| 2004/0039951 | A1* | 2/2004 | Naitou et al. ................ 713/300 |
| 2004/0230376 | A1 | 11/2004 | Ichikawa et al. |
| 2005/0003710 | A1* | 1/2005 | Congdon et al. ............. 439/620 |
| 2005/0102098 | A1* | 5/2005 | Montealegre et al. ........ 701/209 |
| 2005/0256635 | A1* | 11/2005 | Gardner et al. .............. 701/201 |
| 2006/0074547 | A1* | 4/2006 | Kaufman et al. ............. 701/200 |
| 2006/0142941 | A1* | 6/2006 | Imai et al. .................... 701/211 |
| 2007/0010942 | A1* | 1/2007 | Bill ............................. 701/209 |
| 2007/0156334 | A1* | 7/2007 | Vu .............................. 701/209 |

FOREIGN PATENT DOCUMENTS

| DE | 103 02 504 | | 9/2004 |
| JP | B2-3353859 | | 9/2002 |
| JP | 2004045340 | * | 2/2004 |
| JP | A-2005-160269 | | 6/2005 |
| JP | A-2005-233647 | | 9/2005 |

OTHER PUBLICATIONS

Office Action dated Dec. 12, 2008 in corresponding German patent application No. 10 2007 037 120.0-32 (and English translation).

* cited by examiner

*Primary Examiner*—Jack Keith
*Assistant Examiner*—Muhammad Shafi
(74) *Attorney, Agent, or Firm*—Posz Law Group, PLC

(57) ABSTRACT

A control information output device assumes not only a destination but also a travel route based on accumulated travel route information. Moreover, after a travel is started, if it is found that an assumed travel route is incorrect, assumption of the destination and assumption of the travel route are performed again. Therefore, accuracy of the control information outputted to a driving force control unit is high, and accordingly, it is possible for the driving force control unit to perform control of charging/discharging with an improved energy utilization factor.

14 Claims, 6 Drawing Sheets

TRAVEL ROUTE INFO.

| START COORDINATES | (X1, Y1) |
|---|---|
| START DAY/TIME | JULY 1 (FRI) 7:05 |
| ROUTE | 1→6→17→12→15 |
| COMPLETION COORDINATES | (X2, Y2) |
| COMPLETION DAY/TIME | JULY 1 (FRI) 8:00 |

ROAD CHAR. ADDITIONAL INFO.

| ROUTE | 1→6→17→12→15 |
|---|---|
| CONSUMED ELEC. ENERGY | 162KJ→144KJ→185KJ→238KJ→197KJ |
| AV. SPEED | 25km/h→45km/h→17km/h→12km/h→15km/h |

DRIVING CHAR. INFO.

| ROUTE | 1→6→17→12→15 |
|---|---|
| DRIVING CHAR. | FUEL→FUEL→FUEL→FUEL→ACCEL. |

FIG. 4A

DESTINATION ASSUMPTION (TRAVEL START (X1, Y1))

| TIME ZONE | TRAVEL COMPLETION | | |
|---|---|---|---|
| | (X2, Y2) | (X3, Y3) | (X4, Y4) |
| 7:00~7:30 | M:5 TU:4 W:4 TH:4 F:4 SA:2 SU:0 | M:0 TU:0 W:0 TH:0 F:0 SA:2 SU:0 | M:0 TU:0 W:0 TH:0 F:0 SA:0 SU:0 |
| 7:30~8:00 | M:0 TU:0 W:0 TH:0 F:0 SA:0 SU:0 | M:0 TU:0 W:0 TH:0 F:0 SA:0 SU:0 | M:0 TU:0 W:0 TH:0 F:0 SA:0 SU:0 |
| 8:00~8:30 | M:0 TU:0 W:0 TH:0 F:0 SA:0 SU:0 | M:0 TU:0 W:0 TH:0 F:0 SA:0 SU:0 | M:0 TU:0 W:0 TH:0 F:0 SA:0 SU:0 |
| 8:30~9:00 | M:0 TU:0 W:0 TH:0 F:0 SA:0 SU:0 | M:0 TU:0 W:0 TH:0 F:0 SA:0 SU:0 | M:0 TU:0 W:0 TH:0 F:0 SA:0 SU:4 |

TRAVEL ROUTE ASSUMPTION
(TRAVEL START (X1, Y1), TRAVEL COMPLETION (X2, Y2))

| TIME ZONE | TRAVEL ROUTE | | |
|---|---|---|---|
| | 1→6→17→12→15 | 1→7→18→12→15 | 3→10→14→16 |
| 7:00~7:30 | M:4 TU:3 W:3 TH:2 F:1 SA:0 SU:0 | M:1 TU:0 W:1 TH:2 F:2 SA:0 SU:0 | M:0 TU:1 W:0 TH:0 F:1 SA:2 SU:0 |
| 7:30~8:00 | M:0 TU:0 W:0 TH:0 F:0 SA:0 SU:0 | M:0 TU:0 W:0 TH:0 F:0 SA:0 SU:0 | M:0 TU:0 W:0 TH:0 F:0 SA:0 SU:0 |

ROAD CHAR. ADDITIONAL INFO.
(TRAVEL START (X1, Y1), TRAVEL COMPLETION (X2, Y2))

| ROUTE | SAMPLES | AV. CONSUMED E. ENERGY | AV. SPEED |
|---|---|---|---|
| 1→6→17→12→15 | 25 | 162KJ→144KJ→185KJ→238KJ→197KJ | 25km/h→45km/h→17km/h→12km/h→15km/h |
| 1→7→18→12→15 | 5 | 162KJ→150KJ→192KJ→236KJ→196KJ | 25km/h→30km/h→15km/h→12km/h→15km/h |

DRIVING CHAR. INFO. (1→6→17→12→15)

| DRIVING CHAR. | LINK 1 | LINK 6 | LINK 17 | LINK 12 | LINK 15 |
|---|---|---|---|---|---|
| EMPHASIS ON FUEL | 5 | 5 | 5 | 5 | 5 |
| EMPHASIS ON ACCELERATION | 0 | 0 | 0 | 0 | 0 |
| LESS VARIATION IN SPEED | 0 | 0 | 0 | 0 | 0 |
| REDUCED TRAVEL SOUND | 0 | 0 | 0 | 0 | 0 |

⋮

OUTPUTTED CONTROL INFO.

| LINK NO. | 1 | 6 | 17 | 12 | 15 |
|---|---|---|---|---|---|
| AV. GRADIENT | 1°, 0°, -1° | 0°, 0°, -1° | 0°, 0°, 0° | 0°, 0°, 0° | 0°, 0°, 0° |
| AV. ENERGY | 162KJ | 144KJ | 185KJ | 238KJ | 197KJ |
| AV. SPEED | 25km/h | 45km/h | 17km/h | 12km/h | 15km/h |
| DRIVING CHAR. | FUEL | FUEL | FUEL | FUEL | ACCEL. |
| DISTANCE | 3km | 7km | 3.5km | 3.2km | 2.8km |

○ NODE
● COMPLEMENTARY

HEIGHT
DISTANCE IN HORIZON

○ NODE
● COMPLEMENTARY

AVERAGED AS ZERO

○ NODE
● COMPLEMENTARY
■ SAMPLED GRADIENT POINT
□ COMPLEMENTARY GRADIENT POINT

CONTROL INFORMATION OUTPUT DEVICE

CROSS REFERENCE TO RELATED APPLICATION

This application is based on and incorporates herein by reference Japanese Patent Application No. 2006-251348 filed on Sep. 15, 2006.

FIELD OF THE INVENTION

The present invention relates to a control information output device for outputting control information that is useful in making a discharging plan and a charging plan of an accumulator battery carried on a vehicle.

BACKGROUND OF THE INVENTION

As is widely known, automobiles, such as a gasoline engine car, a hybrid car, and an electric motorcar, have accumulator battery means (lead accumulator battery, lithium ion battery, capacitor, etc.). The above-mentioned automobiles use electric power stored in the accumulator battery means in traveling and generally perform charging as well.

For example, in the case of the gasoline engine car, the electric power of the accumulator battery means is used as operation energy, such as of ignition and an engine ECU, while electric power is stored in the accumulator battery means by rotating a generator with the use of rotational energy of the engine.

Moreover, in the case of the hybrid car and the electric car, the electric power stored in the accumulator battery means is used to rotate the motor to gain the driving power, while regeneration energy obtainable at the time of deceleration or when traveling in a downhill is converted to electric power, which is stored in the accumulator battery means.

Since such rotational energy of the engine and regeneration energy at the time of deceleration are largely affected by a traveling situation, a timing at which the electric power can be stored in the accumulator battery means and the quantity of accumulated energy are also affected by the traveling situation largely. Therefore, it is very important to make the accumulator battery means store electric power efficiently according to the traveling situation. Then, as a technique of making the accumulator battery means store electric power efficiently, there is proposed an invention described in Patent Document 1 described below.

Usually, with the purpose of preventing degradation of the accumulator battery means, the remaining quantity of accumulated energy is controlled to be near the center between an upper limit and a lower limit. For example, the upper value is set to a charging rate of 60% and the lower limit is set to a charging rate of 40%, and the remaining quantity of accumulated energy is controlled to a charging rate of around 50%. A drive control apparatus described in Patent Document 1 is configured to pursue efficiency of accumulation of electricity by temporarily enlarging this control width (a width between the upper limit and the lower limit) when conditions are fulfilled, e.g., when a route includes a downhill section that enables large regeneration energy to be recollected.

Patent Document 1: JP-2005-160269 A

However, in order to temporarily enlarge the control width in this way, when it is not grasped whether there is a downhill section on the route that enables large energy to regenerate, sufficient charging efficiency cannot be obtained (because the battery needs to be discharged sufficiently before the vehicle reaches the downhill section). Therefore, a drive control device described in Patent Document 1 is configured to grasp a predicted travel route by searching a route from the current position to a destination based on information inputted through a user interface. In Patent Document 1, although setting of the destination by the driver is considered as a basic procedure, the destination does not need to be set by the driver but may be predicted from past driving patterns of the driver. However, in this case, even when the prediction of the destination is proper, generally multiple routes reaching the destination can be considered, and therefore the driver does not necessarily choose a predicted route. Therefore, the accuracy of prediction of the route that the driver actually chooses may be not sufficient. When the prediction of the route that the driver actually chooses is wrong, a sufficient quantity of accumulated energy is no longer obtainable. In a worst case, the vehicle may get into inability of traveling.

SUMMARY OF THE INVENTION

The present invention is made in view of such problems, and it is an object of the present invention to provide a control information output device for outputting control information that enables control of charging and discharging with an improved energy utilization factor.

To achieve the above object, as an example of the present invention, a control information output device is provided to include a travel route accumulating unit, a destination assuming unit, a route assuming unit, a road characteristic storing unit, and a control information outputting unit.

The travel route accumulating unit is for accumulating at least a place of departure, a destination, information that can specify the travel route, and a travel frequency of the travel route, as travel route information. The destination assuming unit is for assuming a corresponding destination when the driving start position is considered as the place of departure based on the travel route information accumulated in the travel route accumulating unit. The route assuming unit is for assuming an expectable travel route from the driving start position to the destination that is assumed by the destination assuming unit, based on the travel route information accumulated in the travel route accumulating unit. The road characteristic storing unit is for storing the road characteristic information that is characteristic information of the road for each predetermined road unit. The control information outputting unit is for reading the road characteristic information corresponding to the travel route assumed by the route assuming unit from the road characteristic storing unit and for outputting it to predetermined equipment as the control information.

As another example of the present invention, a method is provided for outputting control information. The method comprises: storing road characteristic information for each predetermined road unit; accumulating as travel route information a place of departure, a destination, information able to specify a travel route, and a travel frequency of the specified travel route; assuming a destination when a driving start position is considered as the place of departure based on the accumulated travel route information; assuming an expectable travel route from the driving start position to the assumed destination, based on the accumulated travel route information; reading road characteristic information corresponding to the assumed travel route from the stored road characteristic information; and outputting the read road characteristic information to predetermined equipment as control information.

BRIEF DESCRIPTION OF THE DRAWINGS

The above and other objects, features, and advantages of the present invention will become more apparent from the following detailed description made with reference to the accompanying drawings. In the drawings:

FIG. 4A is a diagram for explaining destination assumption;

FIG. 4B is a diagram for explaining route assumption;

FIG. 4C is a diagram for explaining road characteristic additional information;

FIG. 4D is a diagram for explaining driving characteristic information;

DETAILED DESCRIPTION OF THE PREFERRED EMBODIMENTS

Hereafter, the embodiments to which the present invention is applied will be described with reference to the drawings. Note that embodiments of the present invention are not restricted by the below-described embodiments at all and may assume various forms as long as they belong to a technical range of the present invention.

(Description of the Configuration)

Figure 1:
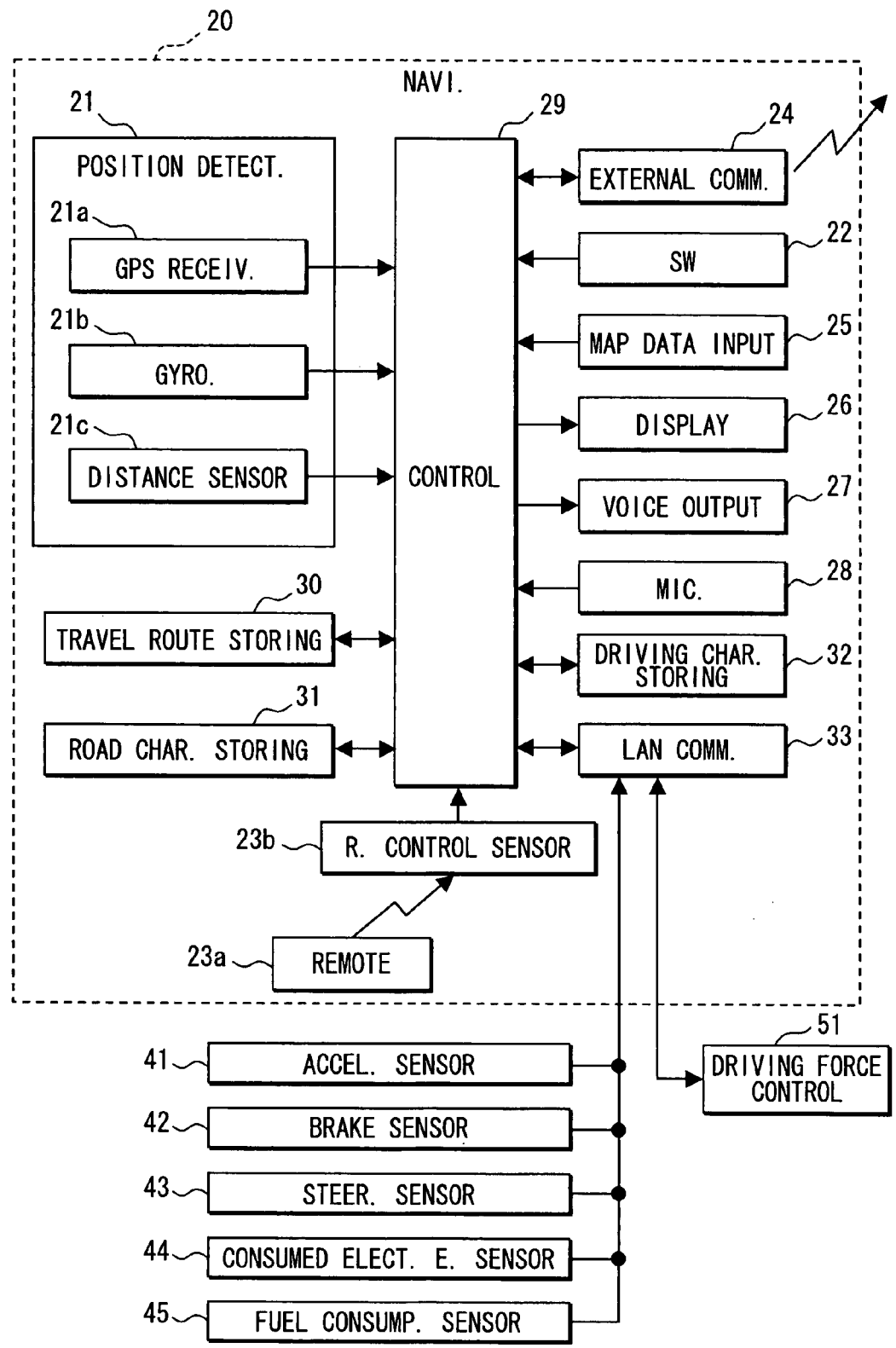
FIG. 1 is a block diagram showing an outline configuration of a navigation system of an embodiment.

FIG. 1 is a block diagram showing an outline configuration of a navigation system 20 as an embodiment in which a function of a control information output device of the present invention is incorporated.

The navigation system 20 is carried on a subject vehicle, i.e., a hybrid car that is powered by a gasoline engine and a motor. The navigation system 20 has: a position detector 21 for detecting a current position of the vehicle; an operation switch group 22 for allowing a user to input various indication; a remote control terminal (hereinafter referred to as remote control) 23a that allows the user to input various indications like the operation switch group 22 and that is formed as a body different from the navigation system 20; a remote control sensor 23b for allowing a signal from the remote control 23a to input thereinto; an external communication apparatus 24 for performing communication with the outside by connecting to a packet communication network etc.; a map data input device 25 for inputting data from a map storage medium that stores map data, voice data, etc.; a display unit 26 for displaying a map and various pieces of information; a voice output device 27 for outputting various guide voice etc.; a microphone 28 for outputting an electrical signal based on a voice that the user utters; a travel route storing unit 30 for storing information about travel route information; an additional road characteristic storing unit 31 for storing information about road characteristic additional information; a driving characteristic storing unit 32 for storing information about driving characteristic information; an in-vehicle LAN communication unit 33 for communicating with various ECU's connected to the in-vehicle LAN (Local Area Network) and the like; and a control unit 29 that performs various processes in response to inputs from the position detector 21, the operation switch group 22, the remote control sensor 23b, the external communication apparatus 24, the map data input device 25, the microphone 28, the travel route storing unit 30, the additional road characteristic storing unit 31, the driving characteristic storing unit 32, and the in-vehicle LAN communication unit 33 and controls the external communication apparatus 24, the display unit 26, the voice output device 27, the travel route storing unit 30, the additional road characteristic storing unit 31, the driving characteristic storing unit 32, and the in-vehicle LAN communication unit 33.

The position detector 21 has a GPS (Global Positioning System) receiver 21a for receiving a radio wave from an artificial satellite for GPS with an unillustrated GPS antenna and outputting the received signal, a gyroscope 21b for detecting the magnitude of rotary motion applied to the vehicle, and a distance sensor 21c for detecting a distance that the vehicle travels from acceleration in the longitudinal direction etc. Then based on the output signals from these sensors 21a to 21c, the control unit 29 calculates a position of the vehicle, an orientation, a vehicle speed, etc. Incidentally, although there are many methods for finding the current position based on the output signal from the GPS receiver 21a, either the stand alone positioning or the differential global positioning system can be taken.

The operation switch group 22 substantially consists of a touch panel constructed integral with a display surface of the display unit 26, mechanical key switches provided on the surrounding of the display unit 26, etc. Incidentally, the touch panel and the display unit 26 are integrated with each other by lamination. Although there exist the touch panels of various types, such as a pressure sensitive type, an electromagnetic induction type, a capacitive type, and a combination of these types, any one of them may be used.

The remote control 23a is made up of multiple buttons and is configured that, when any one of the buttons is pressed, a signal corresponding to the button arrives at the remote control sensor 23b by means of short-distance radio communication such as of infrared ray.

The remote control sensor 23b is configured to receive the signal sent from the remote control 23a and output the received signal to the control unit 29.

The external communication apparatus 24 acquires accident information, traffic congestion information, etc. from an information center of VICS through an optical beacon, an electric wave beacon, etc. that are installed in the roadside.

The map data input device 25 is used for inputting various data stored in an unillustrated map data storage medium (for example, a hard disk, DVD ROM, etc.) into the control unit 29. The map data storage medium stores: the map data (node data, link data, gradient data, cost data, background data, road data, name data, landmark data, crossing data, facility data, etc.), voice data for guide, speech recognition data, etc. Note that the gradient data is a group of aligned average gradients of road segments corresponding to divided portions obtained by dividing the link in three (example: 1°, 0°, −1°).

The display unit 26 substantially consists of a liquid crystal display, an organic EL display, or the like, and can display on a display screen of the display unit 26 additional data of a mark indicating the current position that is specified by a current position of the vehicle detected by the position detector 21 and the map data inputted from the map data input device 25, a guided route to the destination, names, landmarks, symbols of various facilities, etc. being superposed on the map data. Moreover, the display unit 26 can display guidance of facilities etc.

The microphone 28 outputs an electric signal (voice signal) to the control unit 29 based on voice or utterance inputted by the user. The user can operate the navigation system 20 by inputting various voices into the microphone 28.

The travel route storing unit 30 substantially consists of a nonvolatile storage medium, such as a hard disk and flash memory, and stores information about the travel route information. Specifically, the storing unit 30 retains a table for destination assumption and a table for route assumption. Examples of these tables will be described later.

The additional road characteristic storing unit 31 substantially consists of a nonvolatile storage medium, such as a hard disk and flash memory, and stores information about the road characteristic additional information. Specifically, the storing unit 31 retains the road characteristic additional information table. An example of this table will be described later.

The driving characteristic storing unit 32 substantially consists of a nonvolatile storage medium, such as a hard disk and flash memory, and stores information about the driving characteristic information. Specifically, the storing unit 32 retains a driving characteristic information table. An example of this table will be described later.

The in-vehicle LAN communication unit 33 is connected and communicated with various sensors and ECUs such as an accelerator sensor 41, a brake sensor 42, a steering sensor 43, a consumed electric energy sensor 44, a fuel consumption sensor 45, and a driving force control unit 51.

The control unit 29 is constructed with a well known microcomputer substantially consisting of a CPU, ROM, RAM, SRAM, an I/O, bus lines for connecting these constituents, etc. as its core, and performs various processes based on programs stored in the ROM and the RAM. For example, the control unit 29 performs the following processes: a current position display process in which a current position of the vehicle as a set of the coordinates and the traveling direction is calculated based on detected signals from the position detector 21, and the map near the current position read through the map data input device 25 are displayed in the display unit 26; a route calculation process in which an optimal route from the current position to the destination is calculated based on the map data stored in the map data input device 25 and the destination set by operations of the operation switch group 22, the remote control 23a, etc.; a route guide process in which a route is guided by displaying the calculated route on the display unit 26 or outputting it by speech via the voice output device 27; and the like.

Next, the accelerator sensor 41, the brake sensor 42, the steering sensor 43, the consumed electric energy sensor 44, the fuel consumption sensor 45, and the driving force control unit 51 that are connected to the in-vehicle LAN will be explained.

The accelerator sensor 41 is used for detecting the amount of pressing of an accelerator pedal. The brake sensor 42 is a sensor for detecting the amount of pressing of a brake pedal. The steering sensor 43 is used for detecting rotation of a steering.

The consumed electric energy sensor 44 is used for measuring the consumed electric energy of a motor for driving the vehicle, the engine, and the electrical equipment related to traveling.

The fuel consumption sensor 45 is used for measuring the consumption of fuel consumed by the engine.

The driving force control unit 51 is an ECU for controlling the engine and the vehicle driving motor.

(Description of Operations)

Next, among processes that the control unit 29 performs, processes related to the present invention will be explained. Incidentally, for well-known processes that the control unit of the common navigation system performs (route guidance process etc.), explanations are omitted.

(1) Information Collection Process

Figure 2:
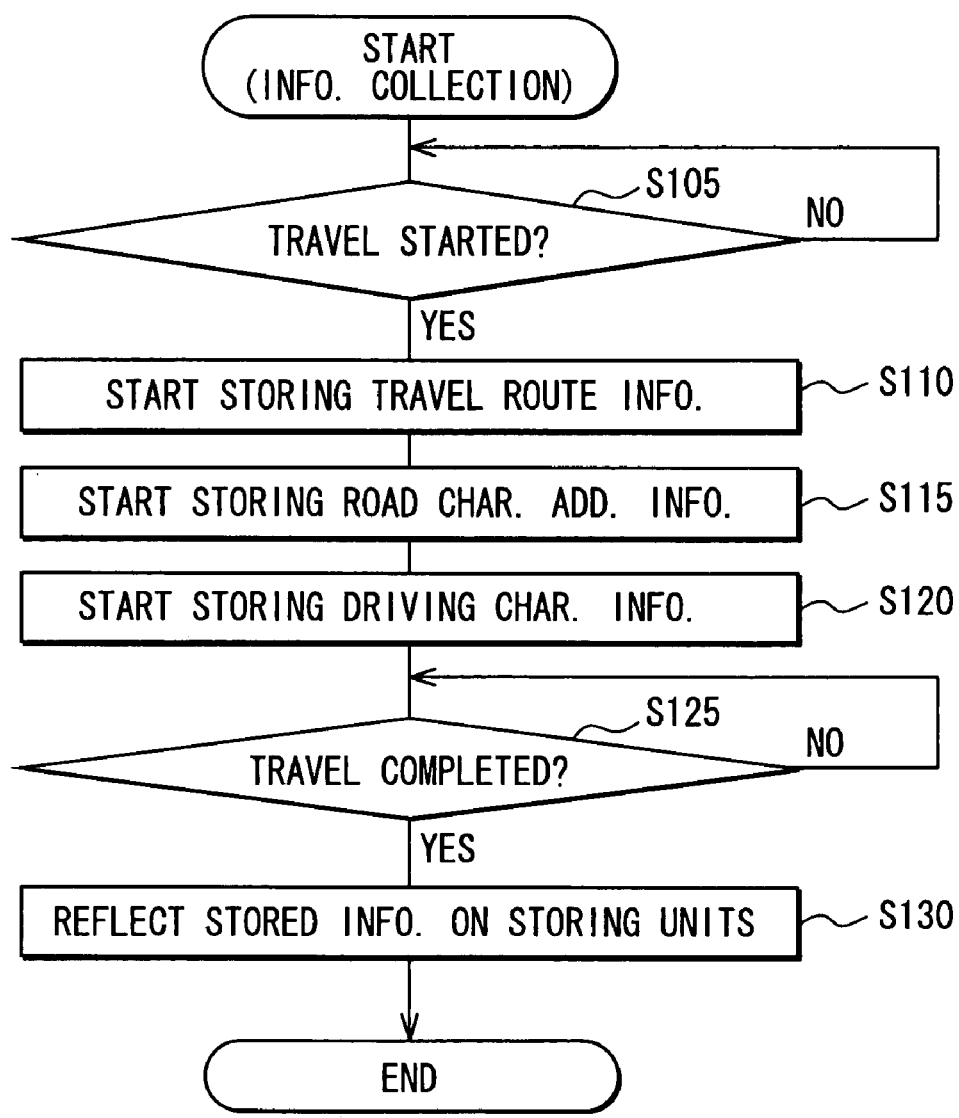
FIG. 2 a flowchart for explaining an information collection process.

First, an information collection process that the control unit 29 performs will be described using the flowchart of FIG. 2. The information collection process starts when electric power supply to the navigation system 20 is started.

When the control unit 29 starts the execution of the information collection process, first it determines whether the travel was started (Step S105). The term "start" means that the vehicle starts to move after a lapse of a predetermined time or more (for example, 10 minutes or more) in a state of a vehicle speed of 0 km/h. That is, in the driver's own house or a visiting place, the start of travel is determined when the vehicle starts to move after the vehicle is stopped for a predetermined time or more. The start of travel is not determined when the vehicle starts to move after temporal stop at a crossing etc. Hereinafter, the traveling start point at this time is called a "place of departure."

As a result of this determination, when the travel is determined to have started (Step S105: Yes), the process moves to Step S110; when the travel is determined not to have started (Step S105: No), the process remains in this step until the travel is started.

At Step S110 to which the process proceeds when the travel is determined to have started, storing of the travel route information is started. This means to store the travel start coordinates (i.e., coordinates of travel start point or place of departure), the travel start day and time, the travel route, the travel completion coordinates (i.e., coordinates of travel completion point or destination), and the travel completion day and time in the RAM of the control unit 29.

Subsequently, storing of the road characteristic additional information is started (Step S115). This means to measure the consumed electric energy and average vehicle speed for each link of the road data, and store it in the RAM of the control unit 29.

Subsequently, storing of driving characteristic information is started (Step S120). This means to determine the driver's driving characteristic for each link of the road data, and store it in the RAM of the control unit 29. Note that the driving characteristics includes a driving characteristic with emphasis on fuel consumption, a driving characteristic with emphasis on sharp acceleration/deceleration, i.e., with fast driving and fast deceleration, and a driving characteristic with less variation in vehicle speed, a driving characteristic with reduced travel sound, etc. Incidentally, this determination uses the well-known method.

Next, it is determined whether the travel was completed (Step S125). This is to determine that the travel is completed in the following cases: a predetermined time or more (for example, 10 minutes or more) is elapsed in a state of the vehicle speed of 0 km/h; an ignition key of the vehicle is turned off; the vehicle reaches a location of registered point, such as the driver's own house; etc. That is, the determination excludes a case where the vehicle stops at a location that is not a destination, such as waiting for a traffic signal to change at a crossing, and the like.

As a result of this determination, when the travel is determined to have completed (Step S125: Yes), the process moves to Step S130; when the travel is determined not to have completed (Step S125: No), the process remains at this step (Step S125).

At Step S130 to which the process proceeds when the travel is determined to have completed, the each piece of information stored in the RAM of the control unit 29 is reflected on the corresponding storing unit. After the each piece of information is reflected on the corresponding storing unit, the information collection process is completed.

Figures 3A, 3B, 3C, 3D:
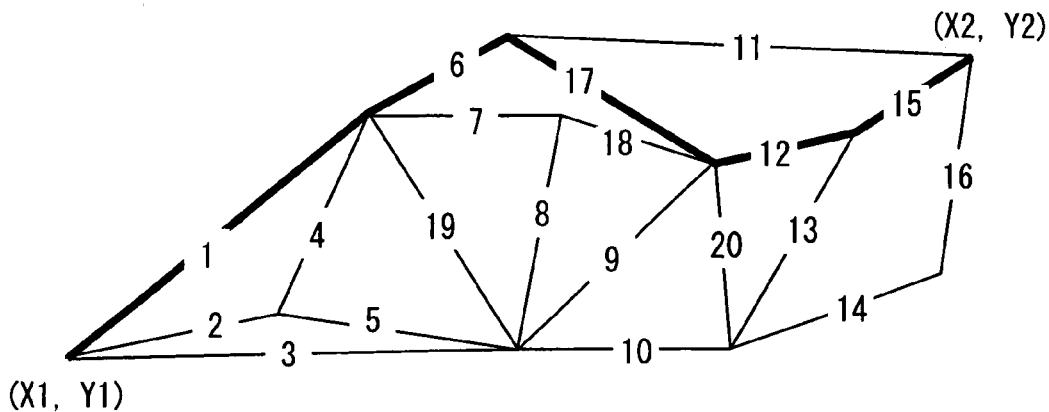
FIG. 3A is a diagram for explaining how links are established from a place of departure.
FIGS. 3B to 3D are explanatory diagrams for explaining travel route information, road characteristic additional information, and driving characteristic information, respectively.

Here, an example of the each piece of information and a reflected state of the corresponding storing unit will be explained using FIGS. 3A to 3D and 4A to 4D. FIG. 3A is an explanatory diagram showing how links are established from the place of departure (coordinates (X1, Y1)) to the destination (coordinates (X2,Y2)). This time, suppose that the driver goes through a link shown by a thick line, departing from the place of departure (coordinates (X1, Y1)) and reaching the destination (coordinates (X2, Y2)). That is, suppose that the vehicle goes through link 1→link 6→link 17→link 12→link 15. In that case, data shown in FIGS. 3B to 3D are stored in the RAM of the control unit 29.

FIG. 3B is the travel route information, which is composed of travel start coordinates (X1, Y1), travel start day and time "July 1 (Fri.), 7:05," travel route "1→6→17→12→15," travel completion coordinates (X2, Y2), and travel completion day and time "July 1 (Fri.), 8:00." Each data of the travel route corresponds to a link number.

FIG. 3C is the road characteristic additional information, which is composed of the travel route "1→6→17→12→15," the consumed electric energy "162 KJ→144 KJ→185 KJ→238 KJ→197 KJ," the average vehicle speed "25 km/h→45 km/h→17 km/h→12 km/h→15 km/h." Incidentally, each data that constitutes the consumed electric energy and average vehicle speed corresponds to the link that constitutes a travel route. Although the data obtained from the consumed electric energy sensor 44 is used to find the consumed electric energy in this embodiment, summation of the consumed electric energy (W) sampled at every second may be expediently used as the consumed electric energy (J), or alternatively when average power consumption is obtainable, the consumed electric energy may be obtained by a calculation formula: the average power consumption (w)×link travel time (s)=the consumed electric energy (J).

FIG. 3D is the driving characteristic information, which consists of a travel route "1→6→17→12→15" and the driving characteristic "with emphasis on fuel consumption→with emphasis on fuel consumption→with emphasis on fuel consumption→with emphasis on fuel consumption→with emphasis on acceleration and deceleration." Incidentally, each data that constitutes the driving characteristics corresponds to a link that constitutes the travel route.

FIG. 4A is the table for destination assumption with travel start coordinates (X1, Y1). That is, the table for destination assumption exists for each travel start coordinates. The table for destination assumption of FIG. 4A is formed in a matrix with a vertical axis of the travel start time zone (7:00-7:30, 7:30-8:00, ... ) and a horizontal axis of travel completion coordinates ((X2, Y2), (X3, Y3)), (X4, Y4), ... ); the number of travels (i.e., travel frequency in travels or visits) to each travel completion coordinates in the travel start time zone is recorded for each day of the week. The table records, for example, that in the travel start time zone 7:00 to 7:30, a travel from (X1, Y1) to (X2, Y2) counts as follows: five times in Monday, four times in Tuesday, four times in Wednesday, four times in Thursday, four times in Friday, two times in Saturday, and zero time in Sunday.

Therefore, checking this table makes it possible to know the coordinates of the destination having the maximum frequency in visits from a specific position as a place of departure in a specific time zone for each day of the week. In addition, this table is created from the travel route information.

FIG. 4B is the table for route assumption with travel start coordinates (X1, Y1) and travel completion coordinates (X2, Y2). That is, the table for route assumption exists for each combination of the travel start coordinates and the travel completion coordinates. The table for destination assumption of FIG. 4B is formed in a matrix with a vertical axis of drive start time zone (7:00-7:30, 7:30-8:00, ... ) and a horizontal axis of travel route (1→6→17→12→15, 1→7→18→12→15, 3→10→14→16); the number of travels (i.e., travel frequency) on the travel route in the travel start time zone is recorded in each corresponding cell for each day of the week. For example, the number of traveling the travel route of 1→6→17→12→15 in a travel start time of 7:00 to 7:30 is recorded as shown below: four times on Monday, three times on Tuesday, three times on Wednesday, two times on Thursday, one time on Friday, zero time on Saturday, and zero time on Sunday.

Therefore, by referring to this table, the number of times of traveling in each travel route in a specific time zone can be known for each day of the week. Incidentally, this table is created from the travel route information.

FIG. 4C shows a road characteristic additional information table with the travel start coordinates (X1, Y1) and the travel completion coordinates (X2,Y2). That is, the road characteristic additional information table exists for each combination of the travel start coordinates and the travel completion coordinates. The road characteristic additional information table of FIG. 4C substantially consists of records of a travel route, the number of data samples, a history of the average consumed electric energy brought into correspondence with a link of a travel route, and a history of average vehicle speed brought into correspondence with the link of the travel route. Incidentally, the number of data sample means the size of a population used in obtaining the average.

Therefore, by checking this table, the average consumed electric energy and the average vehicle speed for each travel route can be known. Incidentally, this table is created from the road characteristic additional information.

FIG. 4D is a driving characteristic information table for the travel route (1→6→17→12→15). That is, the driving characteristic information table exists for each travel route. The driving characteristic information table of FIG. 4D records the number of times of driving with each driving characteristic for each link that constitutes the travel route (1→6→17→12→15).

Therefore, by checking this table, it can be known how many times with which driving characteristic the vehicle is driven for each link. Incidentally, this table is created from the driving characteristic information.

(2) Control Information Output Process

Figures 5, 6:
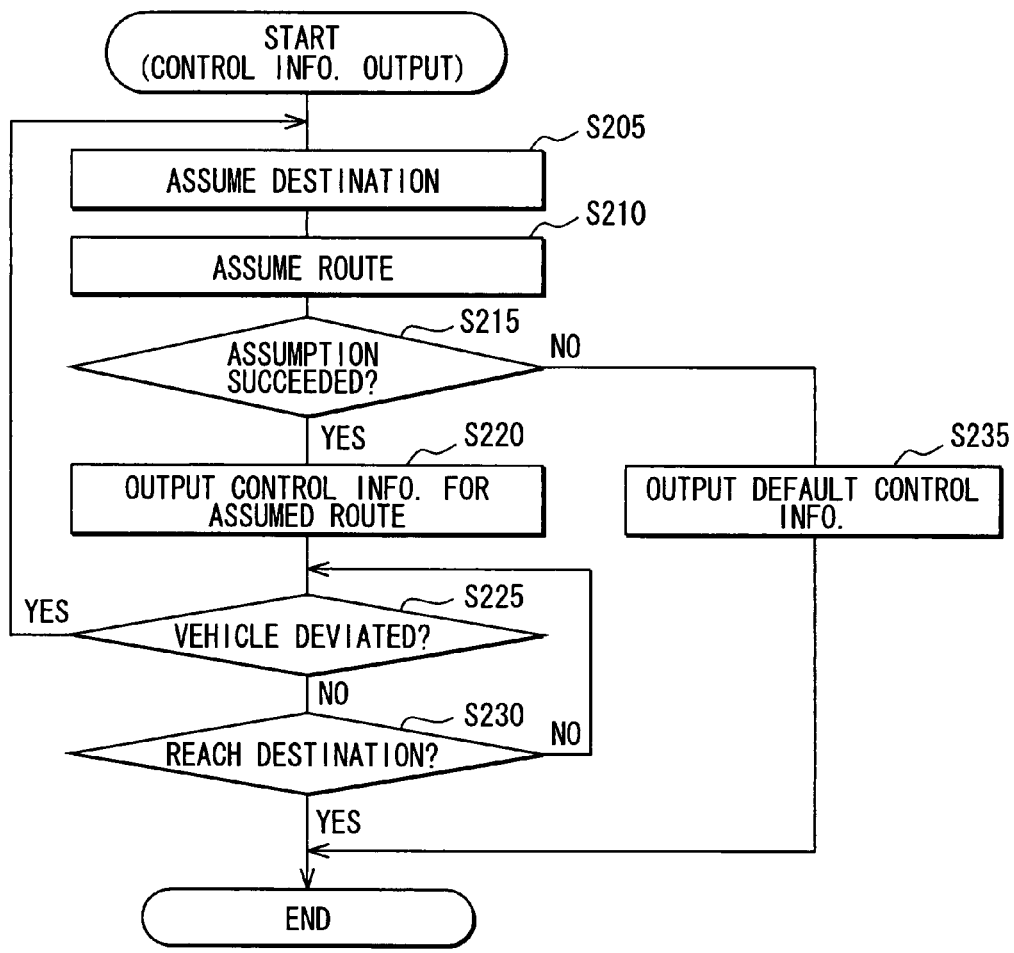
FIG. 5 is a diagram for explaining a control information output process.
FIG. 6 is a diagram for explaining one example of control information.

Next, a control information output process that the control unit 29 performs will be explained using a flowchart of FIG. 5. Incidentally, the control information output process starts to be performed when electric power supply to the navigation system 20 is started.

When the control unit 29 starts execution of the control information output process, first it assumes the destination (Step S205). This is done by considering the current position obtained from a signal of the position detector 21 as the travel start coordinates and first specifying the corresponding table for destination assumption. Then, the travel completion coordinates whose numerical value corresponding to today's day of the week in the pertinent travel start time zone of the specified table for destination assumption is largest is assumed as the destination. For example, when it is assumed that the coordinates of the current position is (X1, Y1), the time is 7:15 Friday; in the table of destination assumption of FIG. 4A, since (X3, Y3) among (X2, Y2), (X3, Y3), and (X4, Y4) is most frequent because of "Friday: 4," it is assumed that the coordinates of the destination to which the driver intends to go are (X2, Y2). Incidentally, if the same maximum value is recorded in multiple destinations or multiple pairs of coordinates, any one of them may be chosen at random, for example.

Next, the expectable travel route is assumed (Step S210). First, this requires specification of the table for travel route assumption that corresponds to a route from the current position to the destination assumed at Step S205. Then, in the corresponding time zone of the specified table for route assumption, the travel route whose numerical value corresponding to today's day of the week is the largest is chosen and designated by the expectable travel route. For example, consider the present time is 7:15 and today' day of the week is Monday. In the table for route assumption of FIG. 4B, since the travel route of "1→6→17→12→15" gives "Monday: 4" indicating most frequent, the travel route that the driver is going to choose is assumed as "1→6→17→12→15." Incidentally, when there are multiple routes whose values are equally largest, one of them may be chosen at random, for example.

Then, it is determined whether both assumption of the destination at Step S205 and assumption of the travel route at Step S210 succeeded (Step S215). When the assumptions are determined to have succeeded (Step S215: Yes), the process moves to Step S220; when the assumptions are determined to have failed (Step S215: No), the process moves to Step S235. Incidentally, the assumptions fail in a case of absence of the table described above and in a case of absence of corresponding data despite existence of the table.

At Step S220, control information corresponding to the assumed travel route is outputted to the driving force control unit 51. An example of this control information will be described later. Subsequently, it is determined whether the vehicle deviates from the travel route assumed at Step S210 (Step S225). This is determined based on the signal obtained from the position detector 21, the map data obtained from the map data input device 25, and the travel route assumed at Step S210.

As a result, when the vehicle is determined to have deviated from the assumed travel route (Step S225: Yes), the process returns to Step S205; when the vehicle is determined not to have deviated from the assumed travel route (Step S225: No), the process moves to Step S230.

At Step S230 to which the process proceeds when the vehicle is determined not to have deviated from the assumed travel route, it is determined whether the vehicle reaches the destination. This is determined from the signal obtained based on the position detector 21, the map data obtained from the map data input device 25, and the travel route assumed at Step S210.

As a result, when the vehicle is determined to have reached the destination (Step S230: Yes), the process (control information output process) is terminated; when the vehicle is determined not to have reached the destination (Step S230: No), the process returns to Step S225.

At Step S235 to which the process proceeds when it is determined that the assumptions could not be done in the determination of Step S215, the default control information starts to be outputted. This control information will be described later. After finishing the outputting the default control information, the process (control information output process) is terminated.

Next, the control information to be outputted at Step S220 will be explained using an explanatory diagram of FIG. 6. Each group of this control information is composed of a link number, an average gradient, average consumed electric energy, an average vehicle speed, a driving characteristic, and a distance. This group exists as much as the number of links each constituting the travel route. Each of the links included in the travel route is indicated by a link number. The average gradient is a group of average gradients corresponding to respective segments of a link or road in this order when dividing the link in three and is acquired from the map data storage medium. The average consumed electric energy is acquired from a road characteristic additional information table. The driving characteristic is acquired from a driving characteristic information table. The distance is acquired from the map data storage medium.

The control unit 29 creates each group of such control information and outputs it to the driving force control unit 51 at a time. The driving force control unit 51 controls a driving force based on the received control information and performs efficient charging/discharging.

Next, the default control information to be outputted at Step S235 will be explained. This control information is outputted to the driving force control unit 51 when the destination or route could not be assumed. The control information is composed of standard numerical values. Elements constituting the control information are basically the same as those of the control information explained using the explanatory diagram of FIG. 6. However, a number indicating undefined is set up for the link number; average numerical values of the link are set up for the average gradient, the average consumed electric energy, the average vehicle speed, and the distance; and a driving characteristic having the largest count among those stored in the driving characteristic information table is set up for the driving characteristic.

Effect of Embodiment

In the foregoing, the configuration and the operations of the navigation system 20 of the embodiments are explained. According to the navigation system 20, the following effects are performed.

Since the navigation system 20 is configured to assume not only the destination but also the travel route based on the accumulated travel route information (FIG. 5, Step S210), accuracy of the assumed travel route is better than the conventional. Therefore, since the accuracy of the control information outputted to the driving force control unit 51 is high, the driving force control unit 51 can make a more efficient charging/discharging plan, and as a result can perform control of charging/discharging with an improved energy utilization factor.

Moreover, the system is configured in such a way that, when it finds the assumed travel route to be incorrect after the travel is started (Step S225: Yes), the system makes assumption of the destination (Step S205) and assumption of the travel route (Step S210) again.

For this reason, even when the assumed travel route is incorrect, assumption for the second time is made automatically, and the control information based on the assumed new travel route is outputted. That is, the control information to be outputted to the driving force control unit 51 is automatically corrected to correct one, and accordingly the driving force control unit 51 can make a more accurate charging/discharging plan, which consequently leads to improvement of the energy utilization factor.

Moreover, the system is configured to output the default control information (Step S235) when assumption of a destination or travel route fails. Therefore, even when the assumption of the destination or travel route fails, the driving force control unit 51 can perform the same control as that in succeeding in the assumption of the destination and travel route without conducting exceptional process in the driving force control unit 51.

Moreover, the system is configured to store information, such as consumed electric energy, average vehicle speed, driver's driving characteristic, that can become effective information in making the charging/discharging plan and output them as the control information. Thus, the driving force control unit 51 can perform control of charging/discharging with an improved energy utilization factor.

Other Embodiment (1) It is preferable to construct the table for destination assumption and the table for route assumption each of which is divided by a unit of month. The table may be composed of portions obtained by dividing the table by the unit of month and assumption of the destination etc. may be done by specifying an element of month. Thus, the accuracies in assuming the destination and the travel route can be further improved.

(2) Although in the above-mentioned embodiment, average gradients that constitute one set of the control information is a group of arranged average gradients corresponding to respective three-divided portions of the link (see FIG. 6), it is preferable to use average gradients of more divided portions obtained by divining the link into more portions. An example will be shown below.

Figure 7A:
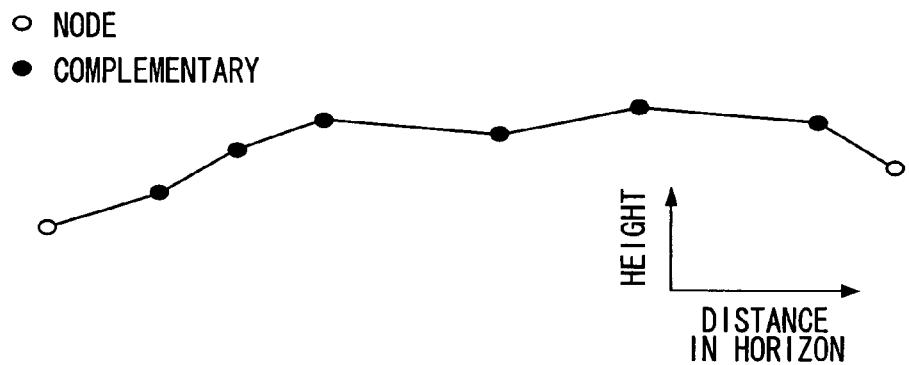
FIGS. 7A to 7C are explanatory diagrams for explaining another example of a method for setting an average gradient (FIG. 7A shows nodes and their complementary shape points, FIG. 7B shows a curve of an actual gradient variation, and FIG. 7C shows a complementary gradient point that is with a large variation of gradient).

FIG. 7A is an explanatory diagram showing nodes (open circle) and their complementary shape points (solid circle) so that a relation between the distance on the horizontal plane and a height becomes clear. The following method may be adopted: as shown in the figure, an angle of a line segment indicated by connecting points is designated by a gradient, and these aligned angles are used as average gradients that constitute a set of the control information.

Figure 7B:
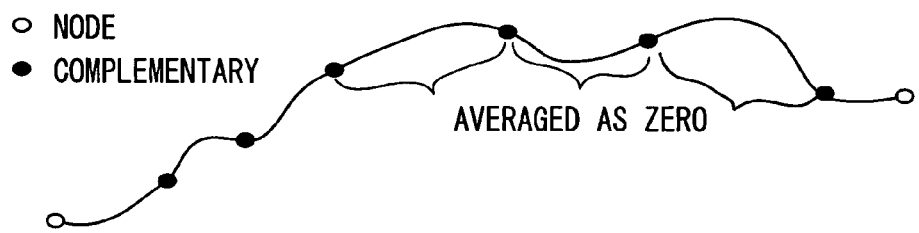

However, since a common complementary shape point is a point for showing a shape variation in a direction along horizontal plane, it does not correspond to gradient variation. Therefore, when an actual gradient variation is a curve shown in FIG. 7B; in the case where the curve changes upward and downward, the gradient becomes near zero. It is considered that such a gradient is sometimes inconvenient as the average gradient used in the present invention.

Figure 7C:
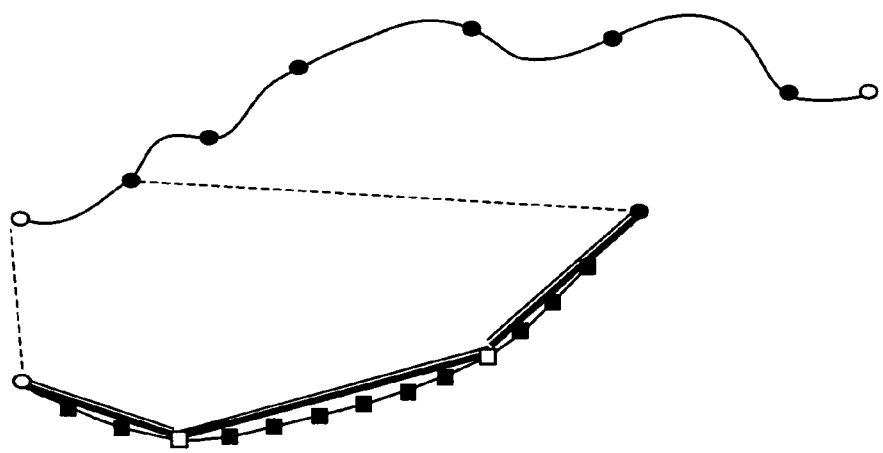

To solve this problem, it is preferable that a location with a large variation of gradient is considered as a complementary gradient point, as shown in FIG. 7C, and a gradient of a line segment connecting the complementary gradient points is used as an average gradient. Incidentally, a "location with a large variation in gradient" described here means a location where the gradient changes from the positive to the negative and a location where a variation of gradient of 1° or more occurs, possibly becoming conversion points of charging control.

Thus, when the determined gradient is stored as an average gradient, the driving force control unit 51 can perform control of charging/discharging with an improved energy utilization factor.

Incidentally, although the complementary gradient points are set between the complementary shape points in FIG. 7C, the nodes may be used instead of the complementary shape points and the complementary gradient points may be set between the nodes. Moreover, when there are too many complementary gradient points, the gradients between complementary gradient points are compared, the complementary gradient points may be set by choosing the predetermined number of the complementary gradient points sequentially from location with large variations (thinning the points).

(3) The default control information outputted at Step S235 may be composed of standard numerical values. However, instead of such control information, data indicating that assumption of the destination or assumption of a route failed may be outputted at Step S235 as the default control information. When it is defined as above, it becomes possible for the driving force control unit 51 to perform an appropriate process prepared by the driving force control unit 51 for a case where the travel route information cannot be acquired.

(4) Although in the above-mentioned embodiment, the system is configured to output the average consumed electric energy to the driving force control unit 51 for each link, it may be configured to output the average power consumption and the average travel time to the driving force control unit 51 instead of the average consumed electric energy. In that case, preferably the system is configured to store the average power consumption and driving time in the RAM of the control unit 29 as the road characteristic additional information on a link basis, and preferably the system is configured to store the average power consumption and the average driving time in the road characteristic additional information table on a link basis. Even when the system is configured as above, the system performs the same effects as the above mentioned embodiments.

The travel route storing unit 30 may function as a travel route accumulating means or unit; the map data storage medium being set in the map data input device 25 may function as a road characteristic storing means or unit; the additional road characteristic storing unit 31 may function as an additional road characteristic storing means or unit; and the driving characteristic storing unit 32 may function as a driving characteristic storing means or unit.

Moreover, the in-vehicle LAN communication unit 33 may function as an additional road characteristic acquiring means or unit and a driving characteristic acquiring means or unit, and the control unit 29 may function as a control information outputting means or unit.

Furthermore, Step S205 in the control information output process that the control unit 29 performs may function as a destination assuming means or unit, and Step S210 in the control information output process that the control unit 29 performs may function as a route assuming means or unit.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, a control information output device has a travel route accumulating unit, a destination assuming unit, a route assuming unit, a road characteristic storing unit, and a control information outputting unit.

The travel route accumulating unit is for accumulating at least a place of departure, the destination, information that can specify the travel route, and travel frequency of the travel route as travel route information. The destination assuming unit is for assuming a corresponding destination when the driving start position is considered as the place of departure based on the travel route information accumulated in the travel route accumulating unit. The route assuming unit is for assuming an expectable travel route from the driving start position to the destination that is assumed by the destination assuming unit, based on the travel route information accumulated in the travel route accumulating unit. The road characteristic storing unit is for storing the road characteristic information that is characteristic information of the road for each predetermined road unit. The control information outputting unit is for reading the road characteristic information corresponding to the travel route assumed by the route assuming unit from the road characteristic storing unit and for outputting it to predetermined equipment as the control information. Note that the "predetermined road unit" means units, such as a unit of a road for connecting crossings (so-called a link) and a road unit for connecting points each showing a variation of a road shape (so-called complementary shape points). Moreover, "predetermined equipment" includes (i) equipment in charge of controlling equipment consuming larger power (for example, an engine ECU, an ECU for controlling a vehicle driving motor, etc.) and (ii) equipment in charge of controlling a charging function.

According to such a control information output device, since the system is configured to assume not only the destination but also the travel route based on the accumulated travel route information, accuracy of the assumed travel route is more excellent than the conventional. Therefore, the accuracy of the control information outputted to the predetermined equipment is higher, and as a result, it is possible to perform control of charging/discharging with an improved energy utilization factor.

As a second aspect, it is preferable that the road characteristic storing unit stores at least either a corresponding distance or average gradient for a predetermined road unit as the road characteristic information.

Generally, a distance and average gradient can become extremely effective information in making a charging/discharging plan. Therefore, when the road characteristic storing unit is configured to store such information and output it to the predetermined equipment as the control information, it becomes possible to perform control of charging/discharging with an improved energy utilization factor in the predetermined equipment.

However, even in the case where accuracy of the assumed travel route is increased higher than the conventional, the assumed travel route is not necessarily 100% right. Then, as a third aspect, it is preferable to adopt the following configuration. When the route assuming unit determines that the assumed travel route is incorrect after the driving is started, it is determined whether a travel route passing through the current position is accumulated in the travel route accumulating unit as the travel route information. When the travel road is determined to have been accumulated, the system will assume again a travel route corresponding to any one of the accumulated travel route information as an expectable travel route.

When the system is configured as above, even when the assumed travel route is incorrect, repeated assumption is made automatically, and the control information based on the assumed new travel route will be outputted. That is, the control information outputted to the above-mentioned predetermined equipment is automatically corrected to correct information. As a result, it becomes possible for the predetermined equipment to perform control of charging/discharging with an improved energy utilization factor.

Moreover, the destination assuming unit or the route assuming unit may fail in the assumption process (for example, the place of departure corresponding to the current position may not exist in the accumulated travel route information, or the like). In such a case, as a fourth aspect, it is preferable that the control information outputting unit is configured to output that fact (i.e., assumption failure) or the predetermined road characteristic information to the predetermined equipment described above as the control information. Incidentally, the "predetermined road characteristic information" may be the fixed control information, or may be the average control information calculated from a travel history of the past etc.

When the system is configured in this way, even when the destination assuming unit or the route assuming unit fails in performing the assumption process itself, it becomes possible for the predetermined equipment described above to perform an appropriate process that is prepared for the case where the travel route information cannot be obtained (a case where "that fact" is sent thereto). Or, the predetermined equipment can perform the same control as that of the time when the destination assuming unit and the route assuming unit succeeded in assuming them without performing exceptional process at all (a case where "predetermined road characteristic information" is sent thereto).

Meanwhile, when making a charging/discharging plan like consumed electric energy or average vehicle speed in a travel route, it is preferable that the above-mentioned system is configured to acquire information that can become effective information and store it. That is, the control information output device is configured to further comprise additional road characteristic acquiring unit for acquiring at least either the consumed electric energy or average vehicle speed as road characteristic additional information for each predetermined road unit, and additional road characteristic storing unit for storing road characteristic additional information acquired by the additional road characteristic acquiring unit for the each predetermined road unit. As a fifth aspect, it is preferable that the control information outputting unit is configured to read the road characteristic additional information corresponding to the travel route assumed by the route assuming unit from the additional road characteristic storing unit and output the read road characteristic additional information to the predetermined equipment as the control information.

When the system is configured to acquire the consumed electric energy or average vehicle speed measured in the past as road characteristic additional information and transmit these pieces of information to the predetermined equipment described above together with the road characteristic information in this way, the system can perform control of charging/discharging in the predetermined equipment with an improved energy utilization factor.

Moreover, it is preferable that the system is configured to further include a driving characteristic acquiring unit for acquiring the driver's driving characteristic as driving characteristic information for the each predetermined road unit and a driving characteristic storing unit for storing the driving characteristic information acquired by the driving characteristic acquiring unit for the each predetermined road unit. As a sixth aspect, it is preferable that the control information outputting unit is configured to read the driving characteristic information corresponding to the travel route assumed by the route assuming unit from the driving characteristic storing unit, and output the read driving characteristic information to the predetermined equipment additionally as the control information. This "driving characteristic information" is information for, for example, specifying the driving characteristic, such as a driving characteristic with emphasis on fuel consumption, a driving characteristic with emphasis on acceleration and deceleration, i.e., with fast driving and fast deceleration, and a driving characteristic with less variation in vehicle speed.

When the system is configured as above, it can make the charging/discharging plan based on the driver's driving characteristic for the predetermined equipment, and accordingly it can perform control of charging/discharging with an improved energy utilization factor.

The road data that a general navigation system uses is generally composed of node data, link data, complementary shape point data defined between the nodes, etc. Therefore, when the road characteristic information that the road characteristic storing unit stores is composed of units each corresponding to the data, it will be convenient because a case where it becomes possible to share a part of the data is also conceivable. However, since the average gradient is information directly connected to the charging, it is preferable that the average gradient is calculated more strictly. For example, as a seventh aspect, it is preferable that the road characteristic storing unit stores a gradient of a line segment connecting the complementary gradient points, each of which corresponds to a location whose variation in road gradient is equal to or more than the predetermined value. Note that "location with the variation equal to or more than the predetermined value" explained here is a location where the gradient varies from positive to negative or a location whose variation in gradient is 1° or more, namely, a location that may become a conversion point of the control of charging.

When the gradient thus defined is stored as the average gradient, it is possible to perform control of charging/discharging with an improved energy utilization factor in the predetermined equipment.

Further, as an eighth aspect, a method is provided for outputting control information. The method comprises: storing road characteristic information for each predetermined road unit; accumulating as travel route information a place of departure, a destination, information able to specify a travel route, and a travel frequency of the specified travel route; assuming a destination when a driving start position is considered as the place of departure based on the accumulated travel route information; assuming an expectable travel route from the driving start position to the assumed destination, based on the accumulated travel route information; reading road characteristic information corresponding to the assumed travel route from the stored road characteristic information; and outputting the read road characteristic information to predetermined equipment as control information.

It will be obvious to those skilled in the art that various changes may be made in the above-described embodiments of the present invention. However, the scope of the present invention should be determined by the following claims.

What is claimed is:

1. A control information output device for a vehicle, the device comprising:
    a travel route accumulating unit configured to accumulate as travel route information a place of departure, a destination, information that specifies a travel route, and a travel frequency of the specified travel route;
    a destination assuming unit configured to assume a destination when a driving start position is considered as the place of departure based on the accumulated travel route information;
    a route assuming unit configured to assume an expectable travel route from the driving start position to the assumed destination, based on the accumulated travel route information;
    a road characteristic storing unit configured to store road characteristic information for each predetermined road unit;
    an additional road characteristic storing unit configured to store, as road characteristic additional information for each predetermined road unit, at least a consumed electric energy actually measured in a travel of the vehicle; and
    a control information outputting unit configured to read, road characteristic information corresponding to the assumed travel route and additional characteristic information corresponding to the assumed travel route from the road characteristic storing unit and the additional road characteristic storing unit, respectively,
    the control information outputting unit being further configured to output the read road characteristic information corresponding to the assumed travel route and the read additional road characteristic information corresponding to the assumed travel route, to predetermined equipment as control information.

2. The control information output device of claim 1, the road characteristic storing unit being further configured to store a distance corresponding to each predetermined road unit as the road characteristic information.

3. The control information output device of claim 1, wherein:
    when the route assuming unit determines that the assumed travel route is incorrect after driving is started, it is determined whether a travel route passing through a current position is accumulated in the travel route accumulating unit as the travel route information;
    when it is determined that the travel road passing through the current position is accumulated, the route assuming unit assumes again a travel route corresponding to any one of the accumulated travel route information as an expectable travel route; and
    wherein the control information outputting unit reads road characteristic information corresponding to the travel route assumed again from the road characteristic storing unit and outputs the read road characteristic information to the predetermined equipment as control information.

4. The control information output device of claim 1, wherein
    when the destination assuming unit or the route assuming unit fails in assuming the destination or the travel route, the control information outputting unit outputs a fact of assumption failure or predetermined road characteristic information to the predetermined equipment as control information.

5. The control information output device of claim 1, further comprising:
    an additional road characteristic acquiring unit for acquiring the road characteristic additional information,
    the road characteristic additional information including not only the consumed electric energy but also an average vehicle speed both actually measured in the travel of the vehicle for each predetermined road unit.

6. The control information output device of claim 1, further comprising:

a driving characteristic acquiring unit for acquiring a driver's driving characteristic as driving characteristic information for each predetermined road unit; and a driving characteristic storing unit for storing the driving characteristic information acquired by the driving characteristic acquiring unit for each predetermined road unit, wherein the control information outputting unit further reads the driving characteristic information corresponding to the travel route assumed by the route assuming unit from the driving characteristic storing unit, and outputs the read driving characteristic information to the predetermined equipment as the control information.

7. The control information output device of claim 1, wherein the control information output device is configured for communication with a driving force control unit in a vehicle, the driving force control unit receiving the control information from the control information outputting unit to control an energy charging/discharging plan of an engine and a vehicle driving motor of the vehicle based on the control information.

8. The control information output device of claim 1, wherein the road characteristic storing unit stores as the road characteristic information an average gradient, in respect of a height from a horizontal plane, of a line segment connecting complementary gradient points, each complementary gradient point being defined as a point whose variation in road gradient in respect of the height is equal to or more than a predetermined value.

9. The control information output device of claim 8, wherein the road characteristic storing unit stores as the road characteristic information node data, road map data including data of nodes and links; and a plurality of complementary shape points are defined as being included in a link between two nodes so that a plurality of average gradients are defined with respect to each link.

10. The control information output device of claim 1, the vehicle using electric power stored in an accumulator battery to travel, wherein the consumed electric energy actually measured in a travel of the vehicle is the electric energy of a motor for driving the vehicle, an engine in the vehicle, and electrical equipment related to traveling.

11. A method for outputting control information, the method comprising:

storing road characteristic information for each predetermined road unit;

storing, as road characteristic additional information for each predetermined road unit, at least a consumed electric energy actually measured in a travel of the vehicle;

accumulating as travel route information a place of departure, a destination, information able to specify a travel route, and a travel frequency of the specified travel route;

assuming a destination when a driving start position is considered as the place of departure based on the accumulated travel route information;

assuming an expectable travel route from the driving start position to the assumed destination, based on the accumulated travel route information;

reading the road characteristic information corresponding to the assumed travel route and road characteristic additional information corresponding to the assumed travel route from the stored road characteristic information and the stored road characteristic additional information, respectively; and outputting the read road characteristic information corresponding to the assumed travel route and the read road characteristic additional information corresponding to the assumed travel route, to predetermined equipment as control information.

12. The method of claim 11, wherein the road characteristic information which is stored includes node data and road map data including data of nodes and links; and a plurality of complementary shape points are defined as being included in a link between two nodes so that a plurality of average gradients are defined with respect to each link.

13. The method of claim 11, further comprising receiving, in a driving force control unit in a vehicle, the control information and controlling an energy charging/discharging plan of an engine and a vehicle driving motor of the vehicle based on the control information.

14. The control information output device of claim 11, the vehicle using electric power stored in an accumulator battery to travel, wherein the consumed electric energy actually measured in a travel of the vehicle is the electric energy of a motor for driving the vehicle, an engine in the vehicle, and electrical equipment related to traveling.

* * * * *